United States Patent
McGrew et al.

(10) Patent No.: US 8,300,824 B1
(45) Date of Patent: Oct. 30, 2012

(54) SYSTEM AND METHOD FOR ENCRYPTING DATA USING A CIPHER TEXT IN A COMMUNICATIONS ENVIRONMENT

(75) Inventors: David A. McGrew, Poolesville, MD (US); Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 815 days.

(21) Appl. No.: 10/822,209

(22) Filed: Apr. 8, 2004

(51) Int. Cl.
   *H04K 1/02* (2006.01)
   *H04L 9/14* (2006.01)
   *H04L 9/16* (2006.01)
   *H04L 9/18* (2006.01)

(52) U.S. Cl. .......... 380/277; 380/269; 380/37; 713/168

(58) Field of Classification Search ............... 29/281.1; 269/311–314, 43, 69; 380/37, 269, 277
   See application file for complete search history.

(56) References Cited

U.S. PATENT DOCUMENTS

| | | | |
|---|---|---|---|
| 5,454,039 A * | 9/1995 | Coppersmith et al. | 380/28 |
| 5,689,566 A * | 11/1997 | Nguyen | 713/155 |
| 5,894,557 A | 4/1999 | Bade et al. | 395/200.58 |
| 5,898,784 A * | 4/1999 | Kirby et al. | 713/153 |
| 5,970,063 A * | 10/1999 | Chapman et al. | 370/346 |
| 6,134,245 A | 10/2000 | Scarmalis | 370/474 |
| 6,192,051 B1 | 2/2001 | Lipman et al. | 370/389 |
| 6,363,065 B1 | 3/2002 | Thornton et al. | 370/352 |
| 6,400,722 B1 | 6/2002 | Chuah et al. | 370/401 |
| 6,477,595 B1 | 11/2002 | Cohen et al. | 710/105 |
| 6,512,754 B2 | 1/2003 | Feder et al. | 370/338 |
| 6,512,773 B1 | 1/2003 | Scott | 370/395.61 |
| 6,721,333 B1 * | 4/2004 | Milton et al. | 370/469 |
| 6,751,729 B1 * | 6/2004 | Giniger et al. | 713/153 |
| 6,772,337 B1 * | 8/2004 | Yener | 713/165 |
| 6,970,459 B1 * | 11/2005 | Meier | 370/389 |
| 7,787,622 B2 * | 8/2010 | Sprunk | 380/37 |
| 2001/0025321 A1 * | 9/2001 | Tang et al. | 709/246 |
| 2002/0104001 A1 * | 8/2002 | Lotspiech et al. | 713/163 |
| 2002/0184487 A1 * | 12/2002 | Badamo et al. | 713/153 |
| 2003/0161326 A1 * | 8/2003 | Pazhyannur et al. | 370/395.52 |
| 2004/0120319 A1 * | 6/2004 | Asawa et al. | 370/395.4 |
| 2005/0015589 A1 * | 1/2005 | Silverman et al. | 713/160 |
| 2005/0165696 A1 * | 7/2005 | Jakobsson et al. | 705/65 |
| 2006/0262931 A1 * | 11/2006 | Nakano | 380/270 |

FOREIGN PATENT DOCUMENTS

FR    2730326 A1 *   8/1996

OTHER PUBLICATIONS

Kent et al. "Security Architecture for the Internet Protocol" RFC 2401, Network Working Group, 1998, pp. 1-66.*
G. Meyer "The PPP Encryption Control Protocol" RFC 1968, Network Working Group, 1996, pp. 1-11.*
Pazhyannur et al. "PPP Multiplexing" RFC 3153, Network Working Group, 2001, pp. 1-9.*

(Continued)

*Primary Examiner* — Matthew Henning
(74) *Attorney, Agent, or Firm* — Baker Botts L.L.P.

(57) ABSTRACT

Data is encrypted by receiving a plurality of bits associated with a communications flow and compressing at least a portion of the bits in order to produce a plurality of sub-frames. The sub-frames may be assembled into a superframe and a stream cipher may be applied to the superframe in order to generate an encrypted packet.

22 Claims, 3 Drawing Sheets

OTHER PUBLICATIONS

Casner et al. "Compressing IP/UDP/RTP Headers for Low-Speed Serial Links", RFC 2508 Network Working Group, pp. 1-24.*

Pazhyannur, R.S.; Ali, I.; Vukovic, I.N., "PPPmux-a new protocol for transporting small IP packets," Communications, 2001. ICC 2001. IEEE International Conference on, vol. 8, No., pp. 2472-2477 vol. 8, 2001.*

P. Rogaway, D. Coppersmith, A Software-Optimized Encryption Algorithm, Journal of Cryptology, vol. 11, No. 4, pp. 273-287, 1998.*

G. Pall, G. Zorn; "Microsoft Point-To-Point Encryption (MPPE) Protocol", RFC 3078, Network Working Group, Mar. 2001, pp. 1-12.*

Schneier, Bruce "Applied Cryptography Second Edition", 1996, John Wiley and Sons, pp. 4, 225.*

Schneier, Bruce; "Applied Cryptography, Second Edition", 1996, John Wiley and Sons, pp. 225, 397-398.*

* cited by examiner

SYSTEM AND METHOD FOR ENCRYPTING DATA USING A CIPHER TEXT IN A COMMUNICATIONS ENVIRONMENT

TECHNICAL FIELD OF THE INVENTION

The present invention relates in general to the field of communications and, more particularly, to a system and a method for encrypting data in a communications environment.

BACKGROUND OF THE INVENTION

Communication systems and architectures have become increasingly important in today's society. One aspect of communications relates to maximizing bandwidth and minimizing delays associated with data and information exchanges. Encryption protocols are generally used in order to ensure the secure propagation of data from one point to another. Encapsulation techniques may be used in conjunction with encryption protocols, as information is packetized and sent to its appropriate next destination. Many encryption technologies (e.g. IPsec) for voice traffic consume unnecessary bandwidth when transmitted across various communication links.

Partial solutions, such as secure real-time protocol (sRTP), address voice encapsulation by using techniques that fail to properly address the issue of bandwidth consumption. In the context of the radio access network (RAN) back-haul, the deficiencies associated with bandwidth consumption and the reliance on standard encapsulation processes are unacceptable.

In other scenarios, the addition of encryption protocols adds a significant expense for a system operator. This is due to the fact that a number of secure technology implementations implicate the use of a chip (e.g. an application specific integrated circuit (ASIC)), which may provide a certain encryption technology. Therefore, any system operations, upgrades, or changes must account for this hardware. Accordingly, the ability to provide a communications system that is secure, consumes few resources, optimizes bandwidth, and achieves minimal delay presents a significant challenge for network designers, service providers, and system administrators.

SUMMARY OF THE INVENTION

From the foregoing, it may be appreciated by those skilled in the art that a need has arisen for an improved encryption approach that consumes minimal bandwidth and creates few cost expenditures in a communications environment. In accordance with one embodiment of the present invention, a system and a method for encrypting data in a communications environment are provided that substantially eliminate or greatly reduce disadvantages and problems associated with conventional encryption techniques.

According to one embodiment of the present invention, there is provided a method for encrypting data in a communications environment that includes receiving a plurality of bits associated with a communications flow and compressing at least a portion of the bits in order to produce a plurality of sub-frames. The sub-frames may be assembled into a superframe and a stream cipher may be applied to the superframe in order to generate an encrypted packet.

Certain embodiments of the present invention may provide a number of technical advantages. For example, according to one embodiment of the present invention, a communications approach is provided that enhances bandwidth parameters for a given architecture. This is a result of the communications scheme, which provides for the application of a stream cipher to a stream of multiplexed point to point protocol (PPP) packets (i.e. PPPmux packets) that contain multiplexed voice samples. These PPPmux sub-frames are combined into a superframe and this superframe may be encrypted using a low-complexity stream cipher. The resulting cipher text may then be transmitted as the payload of the PPP packet. Such an operation significantly reduces the bandwidth allocations of a given architecture for each voice session. This may be beneficial to service providers, as effective encryption protocols reduce bandwidth consumption and, thereby, their operating expenditures (e.g. through the leasing of T1/E1 links).

Another advantage associated with one embodiment of the present invention is the savings on cost expenditures on a component basis. The process provided by the present invention may be optimized for operation on a general-purpose processor (or any other suitable component) in contrast to hardware or application specific integrated circuit (ASIC) implementations. Thus, security may be achieved via a low cost implementation. Moreover, the encryptor that may be implemented consumes about four central processing unit (CPU) cycles per byte (whereas others generally use several hundred CPU cycles per byte).

Note that this enhancement to encryption is flexible in that it can be provided for virtually any communication stream. This is due, in part, to the fact that the solution does not require specific hardware to be implemented. In this sense, minimal overhead is incurred as a result of the operations of the present invention. This further allows such a configuration to accommodate a wide range of incoming flows, as it may be extended to various types of traffic.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
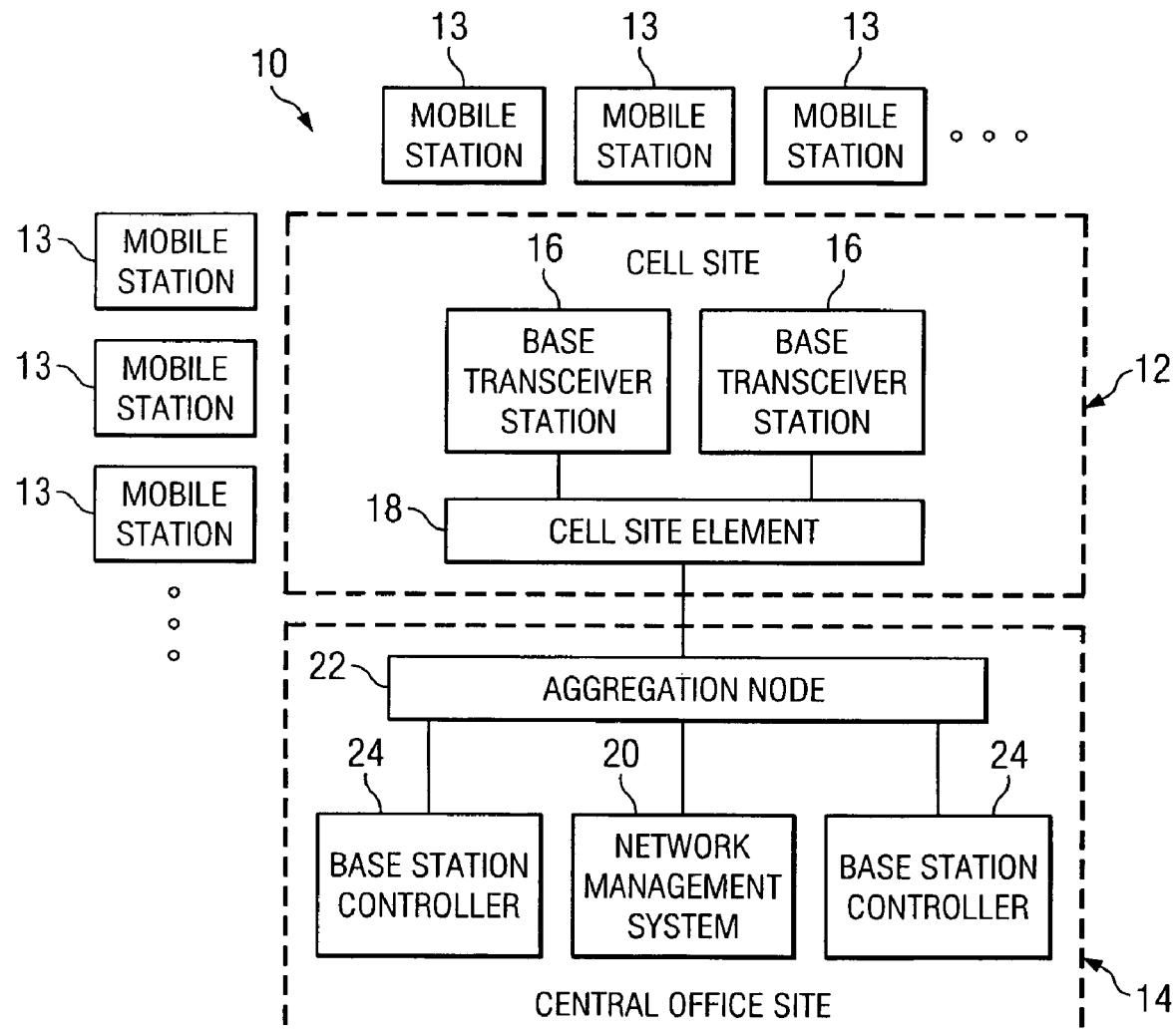
FIG. 1 is a simplified block diagram of a communication system for encrypting data.

FIG. 1 is a simplified block diagram of a communication system 10 for encrypting data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22 and a plurality of base station controllers 24.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end users, subscriber units, or mobile stations 13 may be multiplexed over the time domain.

In accordance with the teachings of the present invention, communication system 10 provides for the application of a stream cipher to a stream of multiplexed point to point protocol (PPP) packets (i.e. PPPmux packets) that may contain multiplexed voice samples. A number of secure technology implementations implicate the use of a chip (e.g. an application specific integrated circuit (ASIC), which may provide a certain encryption technology. Each time encryption capabilities are added to a product such a component must be used. This creates an expense for system operators. In addition, such encryption does not provide for an efficient transport for packet communications. Thus, the overhead of encryption over Internet protocol (IP) is high (particularly for voice traffic, which is generally small (e.g. 10–15 byte packets)). IPsec on top of this encryption creates significant overhead for the packet in order to achieve security. The universal objective for system administrators is an efficient link, whereby voice is transported efficiently on the backhaul between a given base transceiver station and a base station controller.

Communication system 10 addresses these deficiencies in the following manner. In a radio access network (RAN), voice (or data) is transported from the base station controller to the base transceiver station using an A-bis or Iu-b transport mechanism. When this traffic is compressed, the result is a PPPmux sub-frame for each voice sample. This sub-frame is small compared to a standard real-time protocol (RTP)/IP packet that would normally be secured using an IPsec encapsulation. Communication system 10 may combine these PPPmux sub-frames into a superframe and this superframe may be encrypted using a low-complexity stream cipher (e.g. SEAL v. 3.0). The resulting cipher-text is then transmitted as the payload of the PPP packet.

The result of this operation is a substantial reduction in bandwidth consumed for each voice session. Moreover, the efficiency improvement of this scheme compared to voice (in RTP) over an IPsec tunnel (or secured RTP (sRTP)) is significant (potentially 50% or greater) and may result in the ability to provide secure services to any number of RAN products with little impact on the value proposition of link efficiency. In addition, the complexity of this approach allows implementation on general-purpose processors (GPPs) without the use of specialized hardware. This generally results in less cost expenditures for a network operator.

Thus, bandwidth savings may be realized in accordance with the teachings of the present invention. Note also that the implementation of security is offered at a low cost. The encryptor may use about four central processing unit (CPU) cycles per byte, whereas other architectures use several hundred CPU cycles per byte. An important component in the process is to take small user datagram protocol (UDP) based voice packets and transport them over a T1/E1 line, while consuming as little bandwidth as possible. An algorithm (e.g. via software) may be provided in both cell site element 18 and aggregation node 22 to achieve such operations. The algorithm may be optimized for operation on a general-purpose processor in contrast to inflexible hardware or ASIC implementations.

In operation of an example flow (used for purposes of teaching and discussion only), on the interface at the base transceiver station, packets may be received in any number of formats (e.g. TDM, high level data link control (HDLC), asynchronous transfer mode (ATM), IP, etc.) and these packets may be converted into a UDP/IP packet. A compression protocol (cUDP/IP) may then be applied to the packets in order to reduce the UDP/IP overhead to two or three bytes. Then, a PPP multiplexing operation may be used to derive a large packet containing multiple sub-frames (one sub-frame for each original [voice or data] packet from the base transceiver station).

A suitable encryptor may then be applied to the entire PPPmux frame. As part of the encryption process, the entire frame is ciphered: producing a frame of the same length (but having undergone a cipher process). The cipher is generally an encryptor and includes a key, which (in this example scenario) is 160 bits large. The encryptor may be viewed as a polynomial (i.e. a mathematical operation) to be used on the bit stream. The encryptor could include a series of logic gates that are applied to a TDM stream. The bits are manipulated by the polynomial, as directed by the key. The result is that the bits are changed according to the key in order to hide or mask the original contents of the data that is propagating. Information may then be added in order to signal the type of encryption technique being used, the sequence number to keep track of the encrypted frames, an authentication text (or cyclic redundancy check (CRC) element) to make the frame unique within the system, or any other suitable element.

Once the communication flow arrives at aggregation node 22, a determination is made based on the security parameter index (SPI) field as to which type of algorithm to apply to the packet. The cipher may be applied in a symmetrical fashion with the same cipher key, which results in producing the data segment that was originally available at cell site element 18 before the cipher was applied. This operation behaves as a transform function in restoring the original information. This provides a PPPmux packet, whereby each packet may be used to obtain multiple sub-frames. Compressed UDP (cUDP) may then be applied to produce UDP packets. Each UDP packet may then be sent to the base station controller in the original transport form (e.g. ATM). Note that this process could apply to any compression protocol (e.g. HDLC, GSM A-bis, ATM, etc.).

Mobile stations 13 may be used to initiate a communication session that may benefit from such an encryption protocol. Mobile stations 13 may be an entity, such as a client, subscriber, end user, or customer that seeks to initiate a data flow or exchange in communication system 10 via any suitable network. Mobile stations 13 may operate to use any suitable device for communications in communication system 10. Mobile stations 13 may further represent a communications interface for an end user of communication system 10. Mobile stations 13 may be a cellular or other wireless telephone, an electronic notebook, a computer, a personal digital assistant (PDA), or any other device, component, or object capable of initiating a data exchange facilitated by communication system 10. Mobile stations 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile stations 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)).

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby a mobile switching center provides an interface between base station controllers 24 (of central office site 14) and a packet switched telephone network (PSTN), an IP network, and/or any other suitable communication network. Base transceiver stations 16 may be coupled to cell site element 18 by a T1/E1 line or by any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver station 16. Some of the responsibilities of base station controllers 24 may include management of radio channels and assisting in handoff/handover scenarios.

In operation, layer one based (e.g. time division multiplexed (TDM), GSM, 8.60) or layer two based (e.g. Frame Relay, HDLC, ATM, PPP over HDLC) traffic may be communicated by each base transceiver station 16 to cell site element 18 of cell site 12. Cell site element 18 may also receive IP or Ethernet traffic from network management system 20. Cell site element 18 may multiplex together payloads from the layer two-based traffic that have a common destination. The multiplexed payloads, as well as any payloads extracted from the IP or Ethernet traffic, may be communicated across a link to aggregation node 22 within central office site 14. Aggregation node 22 may demultiplex the payloads for delivery to an appropriate base station controller 24 or network management system 20.

Note that use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Each of these elements may include a compressor and/or a decompressor where appropriate. Additionally, each of these elements may include an algorithm used to achieve the encryption operations as described herein. In an example embodiment, software is included in cell site element 18 and/or aggregation node 22 to achieve this purpose. Alternatively, such code-based compression and multiplexing may be achieved by any suitable hardware, component, device, ASIC, additional software, processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, selected functionalities could be readily embodied in a separate component, device, or module.

In operation of an example implementation of communication system 10, negotiation of the encryption protocol may use the PPP encryption control protocol (ECP) [RFC1968] and an individual link encryption control protocol (ILECP) on multi-link point to point protocol (MLP) interfaces. Once the encryption protocol (negotiated via a link control protocol (LCP)) has entered the open state, packets may be encrypted (e.g. using SEAL including higher layer control protocols for PPPmux and cUDP).

The following example parameters are provided with reference to SEAL for purposes of teaching; however, communication system 10 is flexible in its applications and, thus, may alternatively accommodate a host of other encryption protocols. The following parameters may be negotiated using LCP: 1) SEAL version (version of SEAL encryption algorithm to use (default: 1)); 2) SEAL key length (# of bits in SEAL cipher key (default: 160-bit)); 3) key exchange method (shared-secret (1 default), manual (2) or Internet key exchange (3)); 4) auth version (version of authentication header algorithm to use (default 1)); 5) authtag length (this determines if the authtag is 32-bit or 96-bit in length; this parameter can be negotiated at any time, however, it should be the same on both ends of the PPP link and so the remote peer should also negotiate the same authtag length); and 6) padding (the # of bits to align the cipher-text with (e.g. 32, 64, 128); the padding bits are pseudo-random values, whereby the default is 0 (no padding)).

Over the bearer-plane, each PPPmux superframe (starting from PPP protocol ID (PID)) represents the plaintext to be encrypted. The cipher-key and sequence parameter may be used to generate a key sequence, which may then be XORed (in this example implementation) with the plaintext to generate the cipher-text. The resulting cipher-text is the same size as the original plaintext and is optionally padded (to an n-bit boundary) to disguise the plaintext size. A cipher-key may be used for each PPP session and should not be reused between sessions. Because a PPP session can last for a long time (e.g. between router reboots) it is possible that the key is used beyond the run length (sequence) of the cipher (i.e. 32-bits worth of packets). Therefore, a new cipher-key may be needed periodically (e.g. less than 49 days with a 1 ms PPP-mux timer). An auth-key (for the authtag calculation) may also be needed and require an updating at the same frequency (as the cipher-key since they are both used as often).

Two mechanisms may be provided for the key exchange to establish the security association (i.e. an SPI). The first and simplest method may use a simple Diffie-Hellman key exchange mechanism using control messaging at the L2/PPP level. The second variation may use IKE to establish the security association. This latter mechanism may require that cell site element 18 or aggregation node 22 be in-service (INSV) and have IP connectivity to the rest of the network (i.e. to access the peer). This may translate into cell site element 18 or aggregation node 22 being insecure during this time and, therefore, an L2-based approach is generally preferred. In either case, the Diffie-Hellman key exchange algorithm may be used to exchange a shared secret (SS) of at least 512-bits. Once the Diffie-Hellman SS is received, the SEAL cipher and authentication keys may be derived from the 512-bit SS. The cipher-key may be at the bottom 160-bits of the SS, while the remaining bits may be reserved for the authentication-key.

One advantage of the L2-based approach, as compared to IKE, is that the WAN link does not pass unencrypted traffic because the link cannot go to the 'open' state before encryption is enabled. The disadvantage of the L2 DH-based approach is that the unauthenticated Diffie-Hellman is vulnerable to the "man in the middle" attack. The L2 approach may also provide the advantage of being proprietary, making the back-haul more complex to reverse engineer.

Communication system 10 may secure the point-to-point wide area network (WAN) link providing secure access to the IP network (e.g. Intranet) for devices connected to cell site element 18 or aggregation node 22. These devices may not support end-to-end security (e.g. IPsec) and, thus, securing the WAN link is important to improving overall security of the solution. Ideally, what are desired are the fundamental benefits of IPsec and IKE mechanisms applied to the WAN link (i.e. a leased-line encryptors). To this end, a simplified form of IKE is provided, which offers the SEAL keys (cipher-key, auth-key) without the complexity of IKE. The Diffie-Hellman key agreement protocol may be used at the PPP layer (i.e. during LCP) to derive a shared secret (SS). Once the SS is known, the SEAL encryption keys may be derived (as describe above). The Diffie-Hellman parameters may be chosen such that they are compatible with IKE (e.g. a minimum 512-bit shared secret)

The Diffie-Hellman process can be integrated into the LCP negotiation process or part of the encryption control protocol (ECP) process. In general, the following Diffie-Hellman transactions should be completed regardless of which protocol is used: 1) cell site element 18 and aggregation node 22 should exchange the Diffie-Hellman parameters 'p' and 'g' (e.g. 512-bits) where 'p' is very prime; 2) each of cell site element 18 and aggregation node 22 chooses a random private value, 'a' and 'b' (e.g. 1024-bit); 3) element 'a' (cell site element 18) calculates the public value 'p^a mod g', element 'b' (aggregation node 22) calculates 'p^b mod g'; 4) these public values are exchanged between the elements; 6) each element calculates the shared secret 'k=g^b' using the public values they received from their peer, element 'a' calculates (g^b)^a mod p, element 'b' calculates (g^a)^b mod p; and 7) both elements now have a shared secret 'k' which can be used for derivation of the SEAL cipher and authentication keys.

The security association (e.g. an SPI) is established for the PPP interface using IKE in a shared secret (SS) mode. In SS mode, Diffie-Hellman (or any other suitable variant) is used to exchange the shared secret and, hence, the encryption keys. The security association may be established between the two elements (cell site element 18 and aggregation node 22) and, therefore, the management (e.g. loop-back) IP addresses of the elements could be used for the IKE session (e.g. assuming that the IP flow would be between the elements loop-back addresses). Once IKE is complete, the keys may be used for the L2 encryption process (derived from the SS as above) instead of for an IPsec session.

In a system that may be subject to attack by spoofing or a denial of service (DOS), it is useful if cell site element 18 or aggregation node 22 can detect intrusion and take the appropriate actions in order to address the situation. Communication system 10 allows for the use of authentication tags as an integrity and anti-replay mechanism to block simple attacks (i.e. an attacker cannot simply listen to a packet and replay it causing erroneous behavior). When an authentication check fails, the system is likely under attack. In response, cell site element 18 or aggregation node 22 can report the intrusion to the management system (e.g. SNMP TRAP). In addition, cell site element 18 or aggregation node 22 can optionally increase its security level by using a more secure authentication tag. For example, if 256 packets fail authentication, LCP may be used to renegotiate the authtag length from the minimum (32-bits) to the maximum (96-bits). This may add some overhead to each packet, but provides enhanced security.

Figure 2:
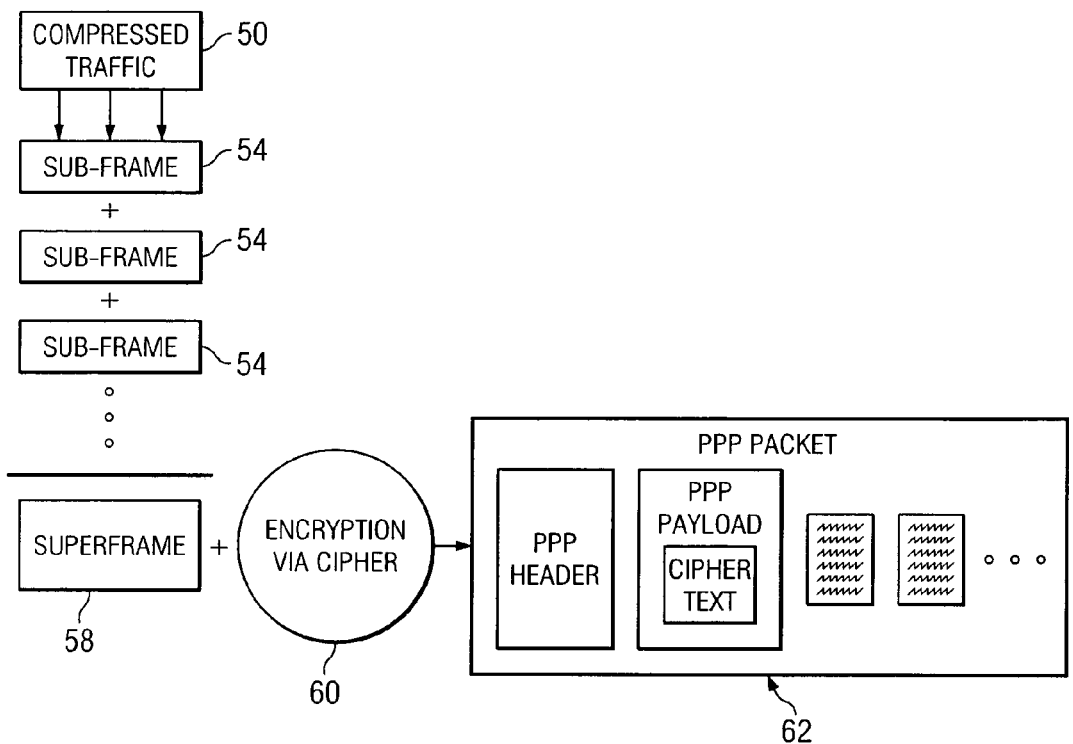
FIG. 2 is a logic diagram of an example encryption operational flow associated with the communication system.

FIG. 2 is a simplified logic diagram of an example process associated with communication system 10. FIG. 2 includes a number of sub-frames 54 that are derived from a segment of compressed traffic 50. FIG. 2 also includes a superframe 58 and an encryption via cipher operation 60. A PPP packet 62 is also provided and includes a PPP header, a PPP payload (that includes the cipher text), and a series of miscellaneous segments that may be included in PPP packet 62. Note that current IP-based solutions (e.g. IPsec) add significant amounts of overhead to voice traffic (i.e. the predominant traffic in a RAN) and require the use of special-purpose encryption hardware for scalability (i.e. 6–8 T-1s). Neither of these characteristics is highly desirable.

Communication system 10 is designed to address both the efficiency and cost aspect of current IP-based security solutions. To address the efficiency issue for a predominantly voice application, encryption is combined with an L2 technology (PPP multiplexing or PPPmux) in such a way that the encryption overhead (authtag, SPI, etc.) is amortized over a large number of voice payloads. In essence, a new layer two encapsulation protocol is defined that encrypts and carries a PPPmux superframe. This reduces the overhead (per voice packet) significantly.

To address cost (i.e. computational complexity), a software-optimized algorithm may be used, which is one order of magnitude less complex than other platforms and, thus, is suitable for implementation on any number of general-purpose processors. Communication system 10 implements a stream cipher (i.e. the cipher text is a function of the position 'x' within the stream) and so sequencing (e.g. a counter) is used for encryption and decryption (i.e. data XOR cipher-key). In this context, the encryption "session" on which the cipher keys are based is the PPP session between cell site element 18 and aggregation node 22.

In operation (and with reference to FIG. 2), voice (or data) is transported from the base station controller to the base transceiver station using an A-bis transport mechanism. When this traffic is compressed, the result is a number of PPPmux sub-frames 54 for each voice sample. Sub-frames 54 are small compared to a standard RTP/IP packet that would normally be secured using an IPsec encapsulation. These PPPmux sub-frames 54 are combined into superframe 58 and superframe 58 is encrypted using a low-complexity stream cipher. The resulting cipher-text is then transmitted as the payload of PPP packet 62. PPP packet 62 may include a PPP header, as well as any additional elements based on particular networking or communication needs.

Figure 3:
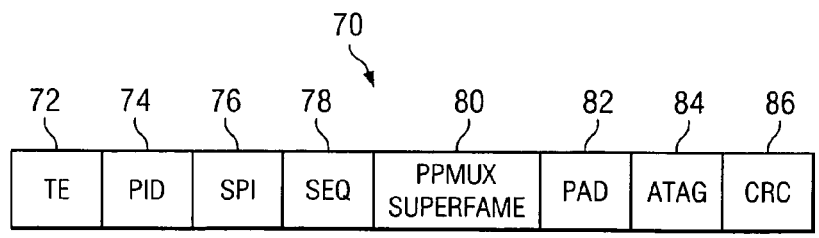
FIG. 3 is a simplified block diagram illustrating an example framing configuration of a packet within the communication system.

FIG. 3 is a simplified block diagram illustrating a PPP over HDLC framing example, as reflected by a packet 70. Element 72 (labeled 7E) reflects an HDLC inter-frame fill character. Element 74 is a PID (i.e. a protocol identifier). Note that the PPPmux PID is redundant and, therefore, not necessarily transmitted. Element 76 is a security parameter index (SPI). In one example, this is an 8-bit field that contains an unsigned integer, which identifies the particular key(s), algorithms, and parameters used in the processing of the cryptographic payload. This field may be set by the sender, and may be used by the receiver to determine the appropriate context to use when processing the packets.

Element 78 is a sequence number, which (in this example) is a 32-bit field containing an unsigned integer. This number may start at one and be incremented after each packet is sent. Element 82 represents a padding segment, which may be an x-bit field that is used to conceal payload packet size. This segment (along with some of the other elements included in packet 70) is optional. Element 84 is an authtag (message integrity check), which is a 32-bit or 96-bit field containing an unsigned integer. This number may contain the result of the per-frame authentication calculation. It is used to prevent attacks on the SEAL ciphertext. The authtag size may be negotiated by LCP (defaulting to 32-bit). Element 86 is a CRC segment, which may be standard, or varied considerably based on particular needs. The CRC in the L2 encapsulation format may be a standard 16 bit HDLC in order to leverage existing hardware.

Figure 4:
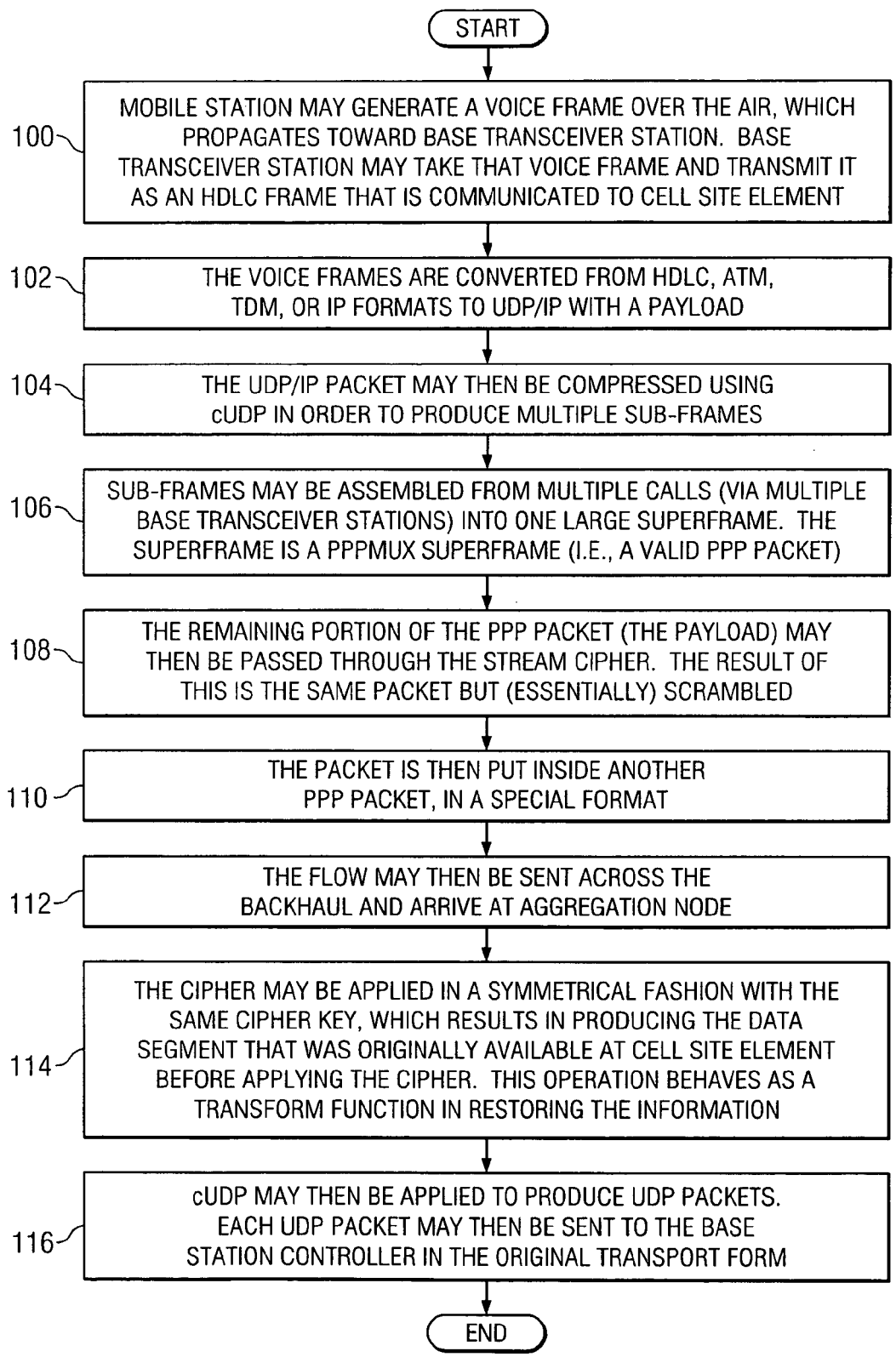
FIG. 4 is a simplified flowchart illustrating a series of example steps associated with the communication system.

FIG. 4 is a simplified flowchart illustrating a series of example steps associated with a method for compressing and multiplexing data in a communications environment. The method addresses one type of compression, but may be readily used to accommodate numerous other types of compression where appropriate. The method may begin at step 100 where mobile station 13 (in a code-division multiple access (CDMA) environment) may generate a voice frame (every 20 milliseconds) over the air, which propagates toward base transceiver station 16. Base transceiver station 16 may take that voice frame and transmit it as an HDLC frame that is communicated to cell site element 18. At the same time, multiple mobile stations 13 may continue to transmit voice frames to base transceiver station 16.

The voice frames may be converted from HDLC to UDP/IP with a payload at step 0.102. The UDP/IP packet may then be compressed using cUDP in order to produce multiple sub-frames at step 104. Sub-frames may be assembled from multiple calls (via multiple base transceiver stations) into one large superframe at step 106. The superframe is a PPPmux superframe (i.e. a valid PPP packet). The protocol ID (PPP ID) from that packet may be discarded because it is redundant. The remaining portion of the PPP packet (the payload) may then be passed through the stream cipher at step 108. The result of this is the same packet but (essentially) scrambled. That packet is then put inside another PPP packet, only in a special format at step 110. The format allows for the identification of the cipher type such that it can be deciphered. Other elements may also be added to the packet (e.g. an authentication data segment as illustrated in FIG. 3). A CRC segment may also be added, and then a PPPoHDLC valid frame may be communicated to its intended next destination.

The flow may then be sent across the backhaul, where it arrives at aggregation node 22 at step 112. A determination is made based on the SPI field as to which type of algorithm to apply to the packet. The cipher may be applied in a symmetrical fashion with the same cipher key, which results in producing the data segment that was originally available at cell site element 18 before applying the cipher at step 114. This operation behaves as a transform function in restoring the information. This provides a PPPmux packet, whereby each packet may be used to obtain multiple sub-frames. cUDP may then be applied to produce UDP packets. Each UDP packet may then be sent to the base station controller in the original transport form (e.g. ATM) at step 116. Note that this process could apply to any compression protocol (e.g. HDLC, GSM A-bis, ATM, etc.).

Some of the steps illustrated in FIG. 4 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 4, it should be understood that various other changes, substitutions, and alterations may be made hereto without departing from the spirit and scope of the present invention. For example, although the present invention has been described with reference to a number of elements included within communication system 10, these elements may be rearranged or repositioned in order to accommodate any suitable routing and compression architectures. In addition, any of the described elements may be provided as separate external components to communication system 10 or to each other where appropriate. The present invention contemplates great flexibility in the arrangement of these elements as well as their internal components.

In addition, although the preceding description offers a compression and encryption protocol to be implemented with particular devices (e.g. aggregation node 22 and cell site element 18), the compression/encryption protocol provided may be embodied in a fabricated module that is designed specifically for effectuating the techniques discussed above. Moreover, such a module may be compatible with any appropriate protocol, other than those discussed herein, which were offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for encrypting data, comprising:
a cell site element associated with a base transceiver station and comprising one or more processors operable to:
receive a plurality of voice packets associated with a communications flow;
convert the plurality of voice packets into a plurality of user datagram protocol/Internet protocol (UDP/IP) packets;
compress at least a portion of the UDP/IP packets using cUDP/IP in order to yield a plurality of sub-frames, each sub-frame corresponding to one of the UDP/IP packets;
assemble the sub-frames into a point-to-point protocol (PPP) superframe;
apply a stream cipher of a plurality of stream ciphers to the PPP superframe at a point to point protocol level to generate a cipher text by:
generating a key sequence from a cipher key and a sequence parameter; and
XORing the key sequence and the superframe to generate the cipher text; and
generate a PPP packet comprising the cipher text, a security parameter index (SPI) field operable to identify the cipher key and an algorithm to decrypt the cipher text, and an authentication data field operable to identify the result of a per-frame authentication calculation.

2. The apparatus of claim 1, wherein the cipher key is used to decipher the PPP packet.

3. The apparatus of claim 1, wherein the PPP packet includes a cyclic redundancy check (CRC) segment.

4. The apparatus of claim 1, further comprising:
an aggregation node associated with a base station controller and operable to receive the PPP packet.

5. The apparatus of claim 4, wherein the aggregation node makes a determination based on, at least, a security parameter index (SPI) field included in the PPP packet as to which type of algorithm to apply to the PPP packet in order to restore data included in the PPP packet to an original form.

6. The apparatus of claim 4, wherein the aggregation node is operable to apply the stream cipher to the PPP packet in a symmetrical fashion by using the cipher key that was used previously in order to restore data included in the PPP packet to an original form.

7. The apparatus of claim 6, wherein the aggregation node is operable to use the cipher key in order to obtain multiple sub-frames that may be used to produce a plurality of UDP packets.

8. The apparatus of claim 7, wherein the aggregation node is operable to communicate one or more of the UDP packets to the base station controller in an original transport format.

9. A method for encrypting data, comprising:
receiving, by a cell site element, a plurality of voice packets associated with a communications flow;
converting the plurality of voice packets into a plurality of user datagram protocol/Internet protocol (UDP/IP) packets;
compressing, by one or more processors of the cell site element, at least a portion of the UDP/IP packets using cUDP/IP in order to yield a plurality of sub-frames, each sub-frame corresponding to one of the UDP/IP packets;
assembling, by the one or more processors of the cell site element, the sub-frames into a point-to-point (PPP) superframe; and
applying, by the one or more processors of the cell site element, a stream cipher of a plurality of stream ciphers to the PPP superframe at a point to point protocol level to generate a cipher text by:
generating a key sequence from a cipher key and a sequence parameter; and
XORing the key sequence and the superframe to generate the cipher text; and
generating, by the one or more processors of the cell site element, a PPP packet comprising the cipher text, a security parameter index (SPI) field operable to identify the cipher key and an algorithm to decrypt the cipher text, and an authentication data field operable to identify the result of a per-frame authentication calculation.

10. The method of claim 9, further comprising:
using, by an aggregation node, the cipher key to decipher the PPP packet.

11. The method of claim 9, further comprising:
determining, by an aggregation node, based on at least a security parameter index (SPI) field included in the PPP packet, which type of algorithm to apply to the PPP packet in order to restore data included in the PPP packet to an original form.

12. The method of claim 9, further comprising:
applying, by an aggregation node, a stream cipher to the PPP packet in a symmetrical fashion by using the cipher key that was used previously in order to restore data included in the PPP packet to an original form.

13. The method of claim 12, further comprising:
using, by the aggregation node, the cipher key in order to obtain multiple sub-frames that may be used to produce a plurality of UDP packets.

14. A system for encrypting data, comprising:
means for receiving a plurality of voice packets associated with a communications flow;
means for converting the plurality of voice packets into a plurality of user datagram protocol/Internet protocol (UDP/IP) packets;
means for compressing at least a portion of the UDP/IP packets using cUDP/IP in order to yield a plurality of subframes, each sub-frame corresponding to one of the UDP/IP packets;
means for assembling the sub-frames into a point-to-point protocol (PPP) superframe; and
means for applying a stream cipher of a plurality of stream ciphers to the PPP superframe at a point to point protocol level to generate a cipher text by:
generating a key sequence from a cipher key and a sequence parameter; and
XORing the key sequence and the superframe to generate the cipher text; and
means for generating a PPP packet comprising the cipher text, a security parameter index (SPI) field operable to identify the cipher key and an algorithm to decrypt the cipher text, and an authentication data field operable to identify the result of a per-frame authentication calculation.

15. The system of claim 14, further comprising:
means for using the cipher key to decipher the PPP packet.

16. The system of claim 14, further comprising:
means for determining, based on at least a security parameter index (SPI) field included in the PPP packet, which type of algorithm to apply to the PPP packet in order to restore data included in the PPP packet to an original form.

17. The system of claim 14, further comprising:
means for applying a stream cipher to the PPP packet in a symmetrical fashion by using the cipher key that was used previously in order to restore data included in the PPP packet to an original form.

18. A non-transitory computer readable storage medium including code for encrypting data, the code operable to:
receive a plurality of voice packets associated with a communications flow;
convert the plurality of voice packets into a plurality of user datagram protocol/Internet protocol (UDP/IP) packets;
compress at least a portion of the UDP/IP packets using cUDP/IP in order to yield a plurality of sub-frames, each sub-frame corresponding to one of the UDP/IP packets;
assemble the sub-frames into a point-to-point protocol (PPP) superframe; and
apply a stream cipher of a plurality of stream ciphers to the PPP superframe at a point to point protocol level to generate a cipher text by:
generating a key sequence from a cipher key and a sequence parameter; and
XORing the key sequence and the superframe to generate the cipher text; and
generate a PPP packet comprising the cipher text, a security parameter index (SPI) field operable to identify the cipher key and an algorithm to decrypt the cipher text, and an authentication data field operable to identify the result of a per-frame authentication calculation.

19. The computer readable storage medium of claim 18, wherein the code is further operable to:
use the cipher key to decipher the PPP packet.

20. The computer readable storage medium of claim 18, wherein the code is further operable to:
determine, based on at least a security parameter index (SPI) field included in the PPP packet, which type of algorithm to apply to the PPP packet in order to restore data included in the PPP packet to an original form.

21. The computer readable storage medium of claim 18, wherein the code is further operable to:
apply a stream cipher to the PPP packet in a symmetrical fashion by using the cipher key that was used previously in order to restore data included in the PPP packet to an original form.

22. The computer readable storage medium of claim 21, wherein the code is further operable to:
use the cipher key in order to obtain multiple sub-frames that may be used to produce a plurality of UDP packets.

* * * * *